(12) United States Patent
Kang et al.

(10) Patent No.: US 10,812,342 B2
(45) Date of Patent: Oct. 20, 2020

(54) GENERATING COMPOSITE NETWORK POLICY

(71) Applicant: Hewlett Packard Enterprise Development LP, Houston, TX (US)

(72) Inventors: Joon Myung Kang, Palo Alto, CA (US); Anubhavnidhi Abhashkumar, Palo Alto, CA (US); Sujata Banerjee, Palo Alto, CA (US); Ying Zhang, Palo Alto, CA (US); Wenfei Wu, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 293 days.

(21) Appl. No.: 15/581,826

(22) Filed: Apr. 28, 2017

(65) Prior Publication Data

US 2018/0316576 A1    Nov. 1, 2018

(51) Int. Cl.
*H04L 12/24* (2006.01)
*H04L 12/26* (2006.01)
(Continued)

(52) U.S. Cl.
CPC .......... *H04L 41/5003* (2013.01); *H04L 41/08* (2013.01); *H04L 43/087* (2013.01);
(Continued)

(58) Field of Classification Search
CPC ... G06F 8/10; G06F 8/65; H04L 41/12; H04L 41/145; H04L 41/5029; H04L 63/0263; H04W 4/50
See application file for complete search history.

(56) References Cited

U.S. PATENT DOCUMENTS 6,393,473 B1   5/2002   Chu
6,463,470 B1   10/2002  Mohaban et al.
(Continued)

FOREIGN PATENT DOCUMENTS

CN   101833497      9/2010
WO   2012/092225 A1  7/2012
(Continued)

OTHER PUBLICATIONS

Sun et al., "A Network-State Management Service", SIGCOMM '14 Proceedings of the 2014 ACM conference on SIGCOMM, Aug. 2014, pp. 563-574.
(Continued)

*Primary Examiner* — Barbara B Anyan

(57) ABSTRACT

Example method includes: receiving, by a network device in a network, a first network policy and a second network policy configured by a network administrator, wherein the first network policy comprises a first metric and the second network policy comprises a second and different metric; detecting, by the network device, a conflict between the first network policy and the second network policy; determining, by the network device, a relationship between the first metric and the second metric; modifying, by the network device, at least one of the first network policy and the second network policy to resolve the conflict based on the relationship between the first metric and the second metric; and combining, by the network device, the first network policy and the second network policy to generate a composite network policy that is represented on a single policy graph.

20 Claims, 10 Drawing Sheets

(51) Int. Cl.
*G06F 8/65* (2018.01)
*H04L 29/06* (2006.01)
*G06F 8/10* (2018.01)

(52) U.S. Cl.
CPC ...... *H04L 43/0829* (2013.01); *H04L 43/0882* (2013.01); *G06F 8/10* (2013.01); *G06F 8/65* (2013.01); *H04L 63/0263* (2013.01)

(56) References Cited

U.S. PATENT DOCUMENTS

| | | | |
|---|---|---|---|
| 6,675,353 | B1 | 1/2004 | Friedman |
| 6,880,005 | B1 | 4/2005 | Bell et al. |
| 7,028,057 | B1 | 4/2006 | Vasudevan et al. |
| 7,096,216 | B2 | 8/2006 | Anonsen |
| 7,707,619 | B2 | 4/2010 | Shelest et al. |
| 7,761,708 | B2 | 7/2010 | Swander et al. |
| 7,941,309 | B2 | 5/2011 | Dubhsh et al. |
| 8,141,125 | B2 | 3/2012 | Maes |
| 8,316,051 | B1 | 11/2012 | Burns et al. |
| 8,443,433 | B2 | 5/2013 | Abzarian et al. |
| 8,479,257 | B1 | 7/2013 | Lloyd |
| 8,499,331 | B1 | 7/2013 | Yehuda et al. |
| 8,560,646 | B1 | 10/2013 | Sivasubramanian et al. |
| 8,830,823 | B2 | 9/2014 | Koponen et al. |
| 8,868,506 | B1 | 10/2014 | Bhargava et al. |
| 8,938,783 | B2 | 1/2015 | Becker et al. |
| 8,984,586 | B2 | 3/2015 | Bezilla et al. |
| 9,141,683 | B1 | 9/2015 | Nagargadde et al. |
| 9,270,704 | B2 | 2/2016 | Clark et al. |
| 9,680,872 | B1 | 6/2017 | Roth et al. |
| 2003/0167277 | A1 | 9/2003 | Hejlsberg et al. |
| 2004/0015496 | A1 | 1/2004 | Anonsen |
| 2006/0020586 | A1 | 1/2006 | Prompt et al. |
| 2006/0025985 | A1* | 2/2006 | Vinberg ............ G06F 8/65 703/22 |
| 2007/0156736 | A1 | 7/2007 | Bestgen et al. |
| 2007/0255769 | A1 | 11/2007 | Agrawal et al. |
| 2007/0261048 | A1 | 11/2007 | Bernabeu-Auban et al. |
| 2008/0034310 | A1 | 2/2008 | Kodosky et al. |
| 2008/0065466 | A1* | 3/2008 | Liu ............... G06F 8/10 705/348 |
| 2008/0133978 | A1 | 6/2008 | Angamuthu et al. |
| 2008/0161941 | A1 | 7/2008 | Strassner et al. |
| 2008/0162109 | A1 | 7/2008 | Strassner et al. |
| 2008/0205377 | A1 | 8/2008 | Chao et al. |
| 2008/0271111 | A1* | 10/2008 | Cox ............ G06Q 10/06 726/1 |
| 2008/0320550 | A1* | 12/2008 | Strassner ......... H04L 63/0263 726/1 |
| 2009/0059814 | A1 | 3/2009 | Nixon et al. |
| 2009/0113420 | A1 | 4/2009 | Pawlowski |
| 2009/0228953 | A1* | 9/2009 | Hu ............ G06F 15/17343 726/1 |
| 2009/0249431 | A1 | 10/2009 | McCollum et al. |
| 2009/0271412 | A1 | 10/2009 | Lacapra et al. |
| 2009/0300069 | A1 | 12/2009 | O'Sullivan |
| 2011/0022681 | A1 | 1/2011 | Simeonov |
| 2011/0125804 | A1 | 5/2011 | Aegerter |
| 2012/0023546 | A1 | 1/2012 | Kartha et al. |
| 2012/0110055 | A1 | 5/2012 | Van et al. |
| 2012/0143876 | A1 | 6/2012 | Srinivasan et al. |
| 2012/0166604 | A1 | 6/2012 | Fortier et al. |
| 2013/0064255 | A1 | 3/2013 | Saavedra |
| 2013/0124567 | A1 | 5/2013 | Balinsky et al. |
| 2014/0025877 | A1 | 1/2014 | Talagala et al. |
| 2014/0033268 | A1 | 1/2014 | Julisch et al. |
| 2014/0096188 | A1 | 4/2014 | Mont et al. |
| 2014/0122670 | A1 | 5/2014 | Levy et al. |
| 2014/0136676 | A1 | 5/2014 | Chow et al. |
| 2014/0150053 | A1 | 5/2014 | Chickering et al. |
| 2014/0189270 | A1 | 7/2014 | Iwanicki et al. |
| 2014/0204948 | A1 | 7/2014 | Beliveau et al. |
| 2014/0230006 | A1 | 8/2014 | Burke et al. |
| 2014/0245423 | A1 | 8/2014 | Lee |
| 2014/0280900 | A1 | 9/2014 | McDowall et al. |
| 2014/0282628 | A1 | 9/2014 | Pruss et al. |
| 2014/0282854 | A1 | 9/2014 | Clark et al. |
| 2014/0337285 | A1 | 11/2014 | Gokhale et al. |
| 2014/0372461 | A1 | 12/2014 | David et al. |
| 2015/0063102 | A1 | 3/2015 | Mestery et al. |
| 2015/0095895 | A1 | 4/2015 | Taneja et al. |
| 2015/0135265 | A1 | 5/2015 | Bagrin |
| 2015/0358209 | A1 | 12/2015 | Zhang et al. |
| 2016/0094647 | A1 | 3/2016 | Mordani et al. |
| 2016/0173371 | A1 | 6/2016 | Bays |
| 2016/0180096 | A1 | 6/2016 | Sharma et al. |
| 2016/0224604 | A1 | 8/2016 | Petculescu et al. |
| 2016/0323377 | A1 | 11/2016 | Einkauf et al. |
| 2016/0344834 | A1 | 11/2016 | Das |
| 2018/0089312 | A1 | 3/2018 | Pal et al. |
| 2019/0171670 | A1 | 6/2019 | Zhuang et al. |

FOREIGN PATENT DOCUMENTS

| | | |
|---|---|---|
| WO | WO-2014147197 | 9/2014 |
| WO | WO-2016186605 | 11/2016 |
| WO | 2017/014769 A1 | 1/2017 |
| WO | 2017/095391 A1 | 6/2017 |

OTHER PUBLICATIONS

Project Proposals, "Project Proposals:Group Based Policy Plugin", Available at <https://wiki.opendaylight.org/view/Project_Proposals:Group_Based_Policy_Plugin>, 9 pages.

Monsanto et al., "Composing Software-Defined Networks", 10th USENIX Symposium on Networked Systems Design and Implementation, Apr. 2013, pp. 1-13.

Mogul et al., "Corybantic: Towards the Modular Composition of SDN Control Programs", HotNets—XII Proceedings of the Twelfth ACM Workshop on Hot Topics in Networks Article No. 1, 2013, pp. 1-7.

McKeown et al., "OpenFlow: Enabling Innovation in Campus Networks", ACM SIGCOMM Computer Communication Review, vol. 38, Issue 2, Apr. 2008, pp. 69-74.

International Search Report and Written Opinion received for PCT Patent Application No. PCT/US2015/063123, dated Aug. 8, 2016, 9 pages.

International Search Report and Written Opinion received for PCT Patent Application No. PCT/US2015/041546, dated Sep. 8, 2016, 10 pages.

International Search Report and Written Opinion received for PCT Patent Application No. PCT/US2014/064394, dated Aug. 5, 2015, 10 pages.

International Preliminary Report on Patentability received for PCT Patent Application No. PCT/US2015/063123, dated Jun. 14, 2018, 8 pages.

International Preliminary Report on Patentability received for PCT Patent Application No. PCT/US2015/041546, dated Feb. 1, 2018, 9 pages.

International Preliminary Report on Patentability received for PCT Patent Application No. PCT/US2014/064394, dated May 18, 2017, 9 pages.

Gember-Jacobson et al., "Fast Control Plane Analysis Using an Abstract Representation," SIGCOMM, Aug. 22-26, 2016.

Fayaz et al., "Efficient Network Reachability Analysis Using a Succinct Control Plane Representation," Proceedings of the 12th USENIX Symposium on Operating Systems Design and Implementation, Nov. 2-4, 2016, 17 pages.

European Search Report and Search Opinion Received for EP Application No. 14905469.4, dated Oct. 19, 2017, 11 pages.

Banikazemi et al., "Meridian: an SDN platform for cloud network services", IEEE Communications Magazine, vol. 51, No. 2, Feb. 2013, pp. 120-127.

Berde, P et al, "ONOS: Towards an Open, Distributed SDN OS", Aug. 22, 2014; 6 pages.

Canini, M et al "Software Transactional Networking: Concurrent and Consistent Policy Composition", Aug. 16, 2013; 6 pages.

(56) References Cited

OTHER PUBLICATIONS

Cisco Systems Inc., "Cisco Application Centric infrastructure Fundamentals", Aug. 1, 2014.

Docker Document; "Docker object labels"; 4 pages; printed on Apr. 26, 2017; from: https://docs.docker.com/engine/userguide/labelscustommetadata/.

Fayazbakhsh, S. K., et al.; "Enforcing network-wide policies in the presence of dynamic middlebox actions using flowtags," Apr. 2014, pp. 533-546.

Janz,, C., et al; "Intent NBI—Definition and Principles"; Oct. 2016; 20 pages.

Kim, H et al, "Simpler Network Configuration with State-based Network Policies", Oct. 1, 2013; 13 pages.

Kim, H. et al.; "Kinetic: Verifiable Dynamic Network Control"; May 4, 2015; 15 pages.

Kubernetes, G.; "Labels and Selectors"; 7 pages; printed Apr. 26, 2017; from https://kubernetes.io/docs/concepts/overview/workingwithobjects/labels/.

Lee, J., et al., International Appl. No. PCT/US2015/030973 entitled Composition Constraints for Network Policies filed May 15, 2015 (35 pages).

Lee, J.; "International Appl. No. PCT/US2014/064394 entitled Network Policy Graphs" filed Nov. 6, 2014 (43 pages).

Mentze, D., et al., ; "Project Proposals:Network Intent Composition"; 5 pages; printed on Apr. 26, 2017 from: https://wiki.opendaylight.org/view/Project_Proposals:Network_Intent_Composition.

Mercian, A., et al; "Network Intent Composition: Main OpenDaylight Project"; Jan. 22, 2015; 7 pages.

Mestery, et al.; "Group-based Policy Abstractions for Neutron," Jul. 2, 2014, pp. 1-13, GitHub, Inc.

Novarese, P.; Docker Success Center: 4 pages; printed on Apr. 26, 2017; from: https://success.docker.com/KBase/Introduction_to_User_Namespaces_in_Docker_Engine.

Open Daylight Project; "Group Based Policy (GBP)"; 2 pages; printed on Apr. 26, 2017: from https://wiki.opendaylight.org/view/Group_Policy:Main.

Prakash, C., et al; "PGA: Using Graphs to Express and Automatically Reconcile Network Policies"; Aug. 17-21, 2015; 14 pages.

Shanbhag, S. et al, "Automated Composition of Data-path Functionality in the Future Internet", Nov./Dec. 2011.

Sravanthi, N.L.P.K. et al, "Applications of Graph Labeling in Major Areas of Computer Science", Aug. 2014.

Turner, Y., et al., "International Appl. No. PCT/US2015/041547 entitled Adding Metadata Associated With a Composite Network Policy"filed Jul. 22, 2015 (35 pages).

\* cited by examiner

GENERATING COMPOSITE NETWORK POLICY

BACKGROUND

High-level or intent-based policies are often used to manage network infrastructures in a scalable and flexible manner. One way to represent network intent is by using policy graph abstraction (PGA). A PGA generally refers to a system that allows network communication policies to be expressed as policy graphs, where a node represents a group of endpoints and an edge represents classification rules. The PGA is capable of representing communication policies, such as, access control list for allowing or denying classified flows. However, the PGA does not support performance-oriented policy and/or dynamic run-time policies that depends on the network environment, such as, network traffic, network flows, time of the day, etc.

BRIEF DESCRIPTION OF THE DRAWINGS

The following detailed description references the drawings, wherein.

DETAILED DESCRIPTION

Examples described herein include a method for modifying a network policy to resolve a conflict based on a relationship between different metrics. The method uses PGA for policy composition with added support for basic connectivity policies, performance-oriented policies, as well as run-time policies that depends on the network environment. While current policy graphs can handle communication policies for reachability, the solution includes an extensive policy graph model and a composition method that can be used to handle diverse policies, including but not limited to, Quality-of-Service (QoS) policies, as well as dynamic stateful and temporal policies. The system allows policy writers to specify their network policies in form of a policy graph. The system is also capable of composing policies from individual policy writers into a single conflict-free policy graph. The policy graph contains possible network policies for runtime changes and avoids any re-composition.

In examples described herein, a network device on which a policy composition engine resides, can receive a first network policy and a second network policy configured by a network administrator, where the first network policy comprises a first metric and the second network policy comprises a second and different metric. Also, the network device can detect a conflict between the first network policy and the second network policy. Then, the network device can determine a relationship between the first metric and the second metric. Moreover, the network device can modify at least one of the first network policy and the second network policy to resolve the conflict based on the relationship between the first metric and the second metric. In addition, the network device can combine the first network policy and the second network policy to generate a composite network policy that is represented on a single policy graph.

Architecture

Figure 1:
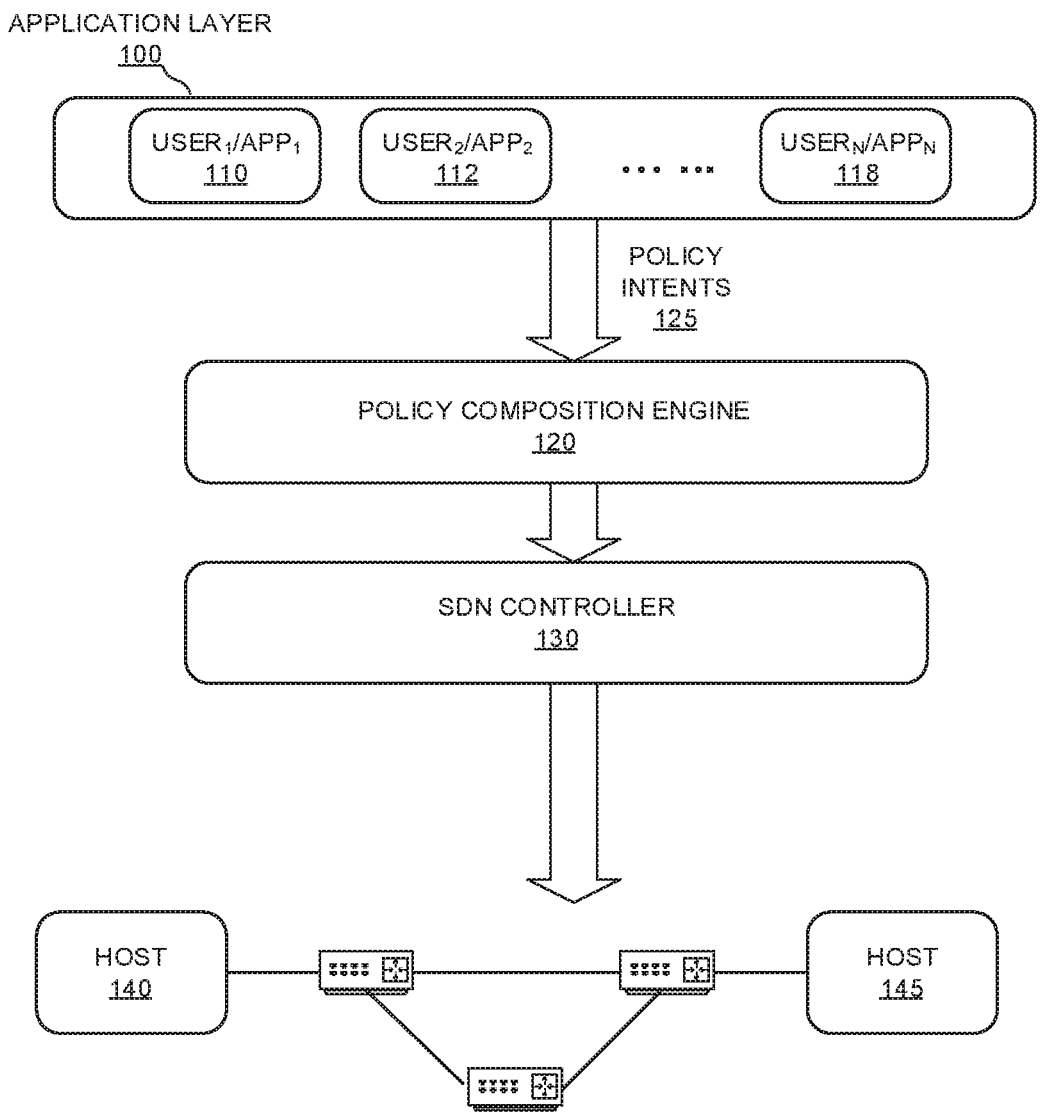
FIG. 1 is a block diagram of an example computing architecture for generating composite network policy.

FIG. 1 is a block diagram of an example computing architecture for modifying a network policy to resolve a conflict based on a relationship between different metrics. FIG. 1 includes an application layer 100 that supports a plurality of users and/or application, such as, $user_1$/$application_1$ 110, $user_2$/$application_2$ 112, ..., $user_N$/$application_N$ 118. The plurality of applications can be deployed in the network on any physical, virtual, or cloud infrastructures.

Application layer 100 may interact with a policy composition engine 120. Policy composition engine 120 generally can compose multiple policies using the composition method according to examples in this disclosure. Multiple policy writers can express their policy intents 125 in the form of input policy graphs. The input policy graphs can specify diverse, stateful, and/or temporal policy in addition to communication policies. It can give more practical policy specification for real SDN-based network environment as well as network function virtualization (NFV) infrastructure. Also, by specifying the dynamic policies at a higher level, the example system avoids recomposing and redeploying policies due to input policy changes.

Policy composition engine 120 can then use an infrastructure controller (e.g., a software-defined network (SDN) controller 130) to deploy these policies in the network. Specifically, in the example of SDN infrastructure, SDN controller 130 may install OpenFlow rules in the example network that includes host 140, host 145, as well as a plurality of routers/switches.

Composing QoS Policies

As used herein, a QoS policy generally refers to any network policy that deals with performance. The QoS policy generally includes at least a QoS metric. Some examples of QoS metrics may include minimum bandwidth guarantee, maximum bandwidth allowed, latency, jitter, packet drop rate, etc. Specifically, the minimum bandwidth guarantee generally refers to the minimum bandwidth guaranteed to a particular flow in the network. Moreover, the maximum bandwidth allowed generally refers to the maximum bandwidth allowed for the particular flow in the network. Further, latency generally refers to the time it takes for a data packet to be transmitted from one designated point to another point in the network. Also, jitter generally refers to the difference between the latency from one data packet to another data packet. Finally, packet drop rate generally refers to the rate of packets lost in transit from a sender to a target during a specific time interval.

In the example system, QoS policies are represented and composed independent of the network-specific values. For example, a network administrator may specify a bandwidth as 50 Mbps. In such cases, labels are added to represent the QoS policies. For illustration purposes only, three labels (high, medium, and low) are used to represent QoS metrics. However, the QoS metrics can also be defined with fewer or more labels.

An example mapping between the network independent labels to the network specific values is shown in Table 1 below. This mapping can be done separately during the deployment stage depending on the target network environment. Using labels at higher level and values at lower level makes this solution flexible and extensible.

TABLE 1

| Values | Labels |
|---|---|
| <100 Mbps | Low |
| >100 & <500 Mbps | Medium |
| >500 Mbps | High |

In policy graphs, the QoS policies can be specified on the edge of the policy graph. For example, a directed edge between two vertices in a policy graph may show "latency: low, minimum bandwidth: medium" to indicate that the network policy includes two QoS metrics. The first QoS metric is latency, and it's mapped to a low priority label. The second QoS metric is minimum bandwidth, and it's mapped to a medium priority label.

Figure 2:
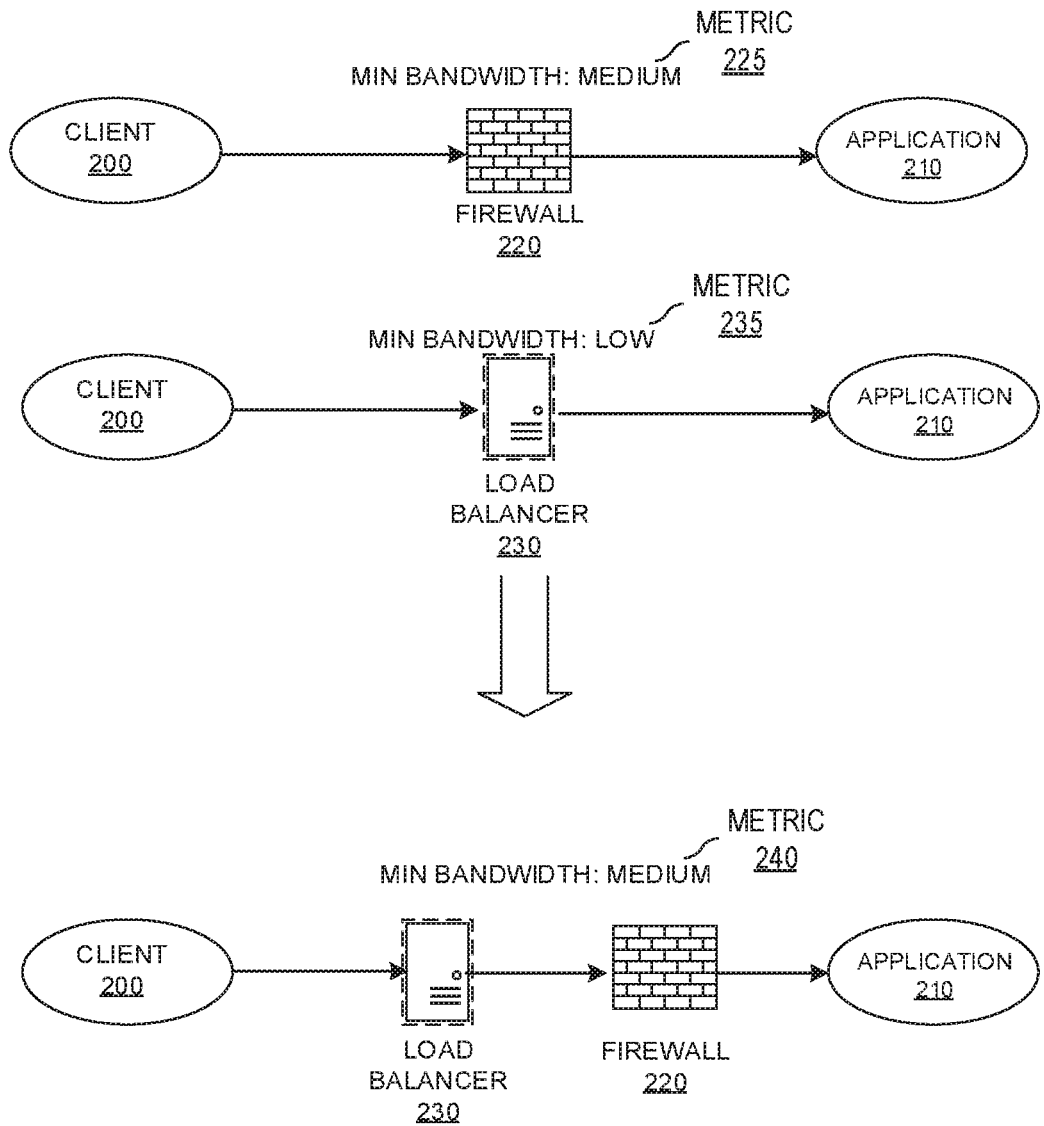
FIG. 2 is a block diagram of an example composition of policy graphs with same Quality-of-Service (QoS) metric.

When combining multiple QoS policies, there are two types of composition problems, namely composing the same QoS metrics and composing different QoS metrics. FIG. 2 shows an example composition of policy graphs with same Quality-of-Service (QoS) metric. FIG. 2 shows two network policies, both of which include a client 200, an application 210, and a directed edge from client 200 to application 210. Additionally, the first network policy includes a firewall 220 and a QoS metric 225. Firewall 220 generally includes any virtual network function that is capable of monitoring and controlling network traffic based on predetermined security rules. The QoS metric specifies that the minimum bandwidth guaranteed to a flow from client 200 to application 210 shall be mapped to a medium priority label. Similarly, the second network policy includes a load balancer 230 and a QoS metric 235. Load balancer 230 generally includes any virtual network function that is capable of distributing network or application traffic across a number of network devices (e.g., servers). The QoS metric specifies that the minimum bandwidth guaranteed to a flow from client 200 to application 210 shall be mapped to a medium priority label. Note that the directed edges in both the first network policy and the second network policy shown in FIG. 2 are defining the same QoS metric, namely, the minimum bandwidth guaranteed in this example.

When composing two network policies having the same QoS metric, the system can select the label that gives better performance, and then change the other label to match the better performing label.

The priority of labels for each of the QoS metrics based on their performance are shown in Table 2 below.

TABLE 2

| QoS | 1st Priority | 2nd Priority | 3rd Priority |
|---|---|---|---|
| Minimum bandwidth guaranteed | high | medium | low |
| Maximum bandwidth allowed | high | medium | low |
| Latency | low | medium | high |
| Jitter | low | medium | high |
| Packet drop rate | low | medium | high |

Because QoS metric 225 is the better performing metric compared to QoS metric 235, the label in QoS metric 225 (e.g., medium) is selected when combining the two network policies to generate the composite network policy. Therefore, the system can generate the composite network policy by (1) keeping the same source (e.g., client 200) and destination (e.g., application 210) of the flow, (2) combining the intermediary network functions on the directed edge between the two vertices in both network policies (e.g., load balancer 230 and firewall 220), and (3) generating the QoS metric label 240 using the selected better performing label (e.g., minimum bandwidth: medium).

Figure 3:
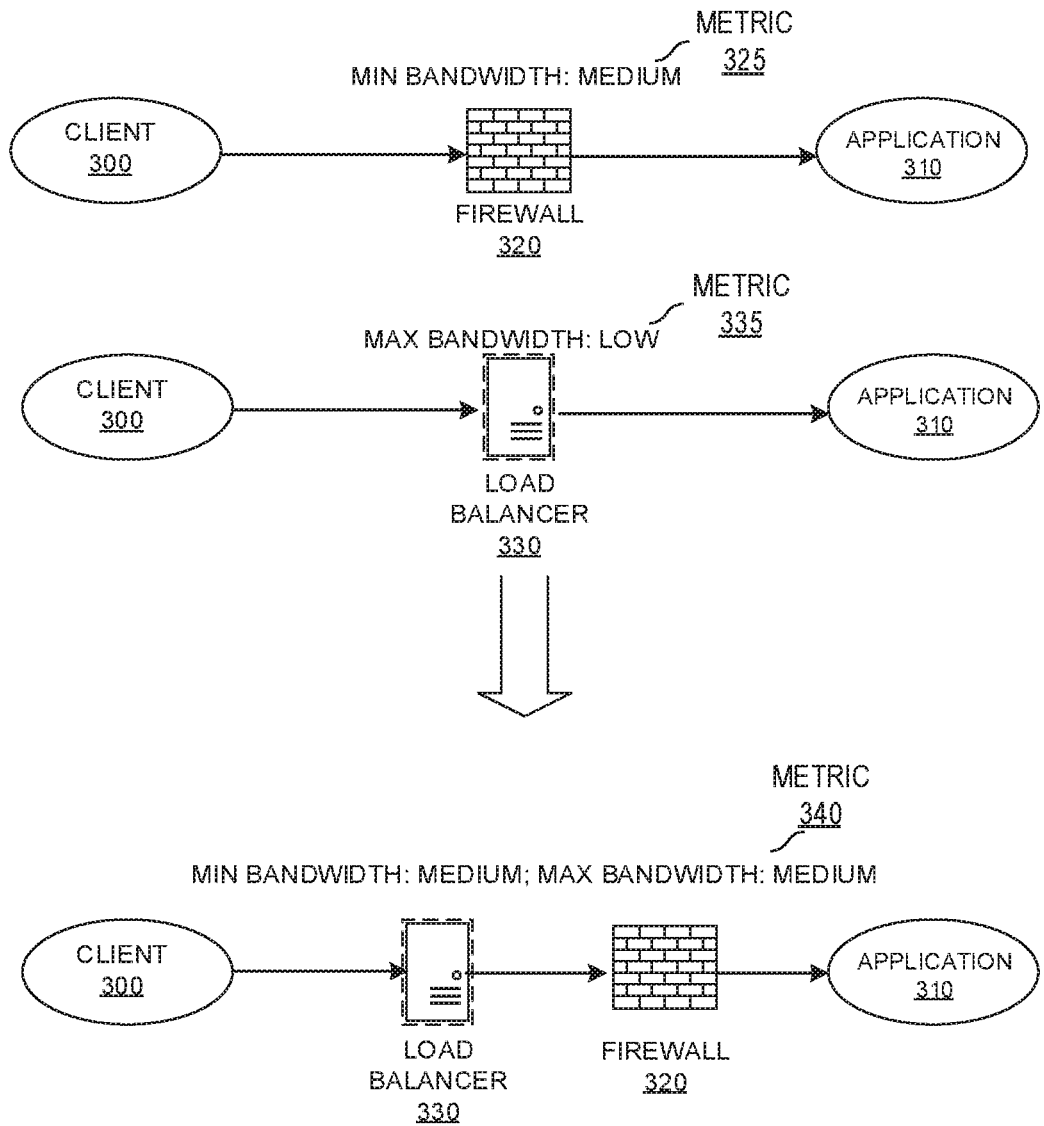
FIG. 3 is a block diagram of an example composition of policy graphs with different Quality-of-Service (QoS) metrics.

FIG. 3 shows an example composition of policy graphs with different Quality-of-Service (QoS) metrics. FIG. 3 shows two network policies, both of which include a client 300, an application 310, and a directed edge from client 300 to application 310. Additionally, the first network policy includes a firewall 320 and a QoS metric 325. Firewall 320 generally includes any virtual network function that is capable of monitoring and controlling network traffic based on predetermined security rules. QoS metric 325 specifies that the minimum bandwidth guaranteed to a flow from client 300 to application 310 shall be mapped to a medium priority label. On the other hand, the second network policy includes a load balancer 330 and a QoS metric 335. Load balancer 330 generally includes any virtual network function that is capable of distributing network or application traffic across a number of network devices (e.g., servers). QoS metric 335 specifies that the maximum bandwidth allowed for the flow from client 300 to application 310 shall be mapped to a low priority label. Unlike in FIG. 2, here, the directed edges in the first network policy defines the minimum bandwidth, whereas the second network policy the bandwidth allowed. Thus, the two network policies define different QoS metrics in this example.

When composing two network policies defining the different QoS metrics, the system first determines whether the QoS metrics are related. If the two QoS metrics are not related, the system can then generate a QoS metric for the composite network policy by combining both QoS metrics (including their labels). For example, assuming that the first QoS metric includes jitter (e.g., jitter: medium) and the second QoS metric includes the maximum bandwidth allowed (e.g., maximum bandwidth: medium). Because there is no relationship between jitter and the maximum bandwidth allowed, the QoS policy metric of the composed edge can include both QoS metrics with their original labels (e.g., jitter: medium, maximum bandwidth: medium).

On the other hand, if the two QoS metrics are related, the system can determine whether there is any conflict between the two QoS metric labels. Specifically, the system can use the conflict resolution table shown in Table 3 below to detect if two QoS metrics are related.

TABLE 3

| | minimum bandwidth | maximum bandwidth | latency | jitter | packet drop rate |
|---|---|---|---|---|---|
| minimum bandwidth | related | related | related | unrelated | related |
| maximum bandwidth | related | related | unrelated | unrelated | unrelated |
| latency | related | unrelated | related | related | Unrelated |
| jitter | unrelated | unrelated | related | related | related |
| packet drop rate | related | unrelated | unrelated | related | related |

If the QoS metrics are related as shown in the example illustrated in FIG. 3, the system can then resolve the conflict using conflict resolution mechanisms described below.

From Table 3, the system can determine at least five different combinations of metrics that have a relationship. First, there is a relationship between the minimum bandwidth guaranteed and the maximum bandwidth allowed. Specifically, the minimum bandwidth guaranteed shall be less than the maximum bandwidth allowed. If the minimum bandwidth guaranteed is greater than the maximum bandwidth allowed, the system can change the priority label of the maximum bandwidth allowed to match the priority label of the minimum bandwidth guaranteed.

Second, there is a relationship between the minimum bandwidth guaranteed and the latency. Specifically, the priority label for the minimum bandwidth guaranteed must be better performing than the priority label for latency. If the latency's label priority is less than the guaranteed minimum bandwidth's label priority, the system can increase the latency's priority label to match the priority label of the minimum bandwidth guaranteed.

Third, the guaranteed minimum bandwidth depends on the packet drop rate, but not vice versa. If the packet drop rate's priority label is worse performing than the guaranteed minimum bandwidth's priority label, then the system can improve the priority label assigned to the packet drop rate to match the priority label of the guaranteed minimum bandwidth. On the other hand, it is appropriate for the minimum bandwidth to have a lower performing priority label than the priority label of the packet drop rate.

Fourth, the jitter QoS metric and the latency QoS metric are incompatible to co-exist with each other. For example, the latency priority label can be guaranteed only if the jitter's priority label is low. If the jitter's priority label is not low, then the system can either remove the latency guarantee or set the jitter's priority label to low.

Finally, the packet drop rate depends on the jitter, but not vice versa. If the jitter's priority label is worse performing than the packet drop rate's priority label, then the system can improve the priority label assigned to the jitter to match the priority label of the packet drop rate. On the other hand, it is appropriate for the packet drop rate to have a lower performing priority label than the priority label of the jitter.

To summarize, conflicts can be resolved in three different ways for three different scenarios. First, if the QoS metrics have a comparison relationship (e.g., the minimum bandwidth guaranteed shall be less than a rate limit), then the conflict can be resolved by modifying a priority label to match the better performing label in order to satisfy the comparison relationship. Second, if metric A depends on metric B but not vice-versa (e.g., the guaranteed minimum bandwidth depends on the packet drop rate; the packet drop rate depends on the jitter; etc.), then the system can modify the priority label of metric A to be better performing than the priority label of metric B. Third, if two QoS metrics are incompatible to co-exist with each other (e.g., the jitter and the latency cannot co-exist), then the system can drop at least one of the incompatible QoS metric.

Note that it is assumed that the system can choose the better performing policy in the above examples. This may not be true sometimes, for example, because of resource constraint, the system may not be able to provide higher performing QoS policy. In such cases, the system can take the network resources into consideration, and may also deny certain compositions due to network resource constraints.

Composing Dynamic Policies

As used herein, dynamic policies generally refers to network policies that vary over time or depend on certain network states. There are two types of dynamic network policies, namely, stateful network policies and temporal network policies.

A. Composing Temporal Network Policies

Figure 4:
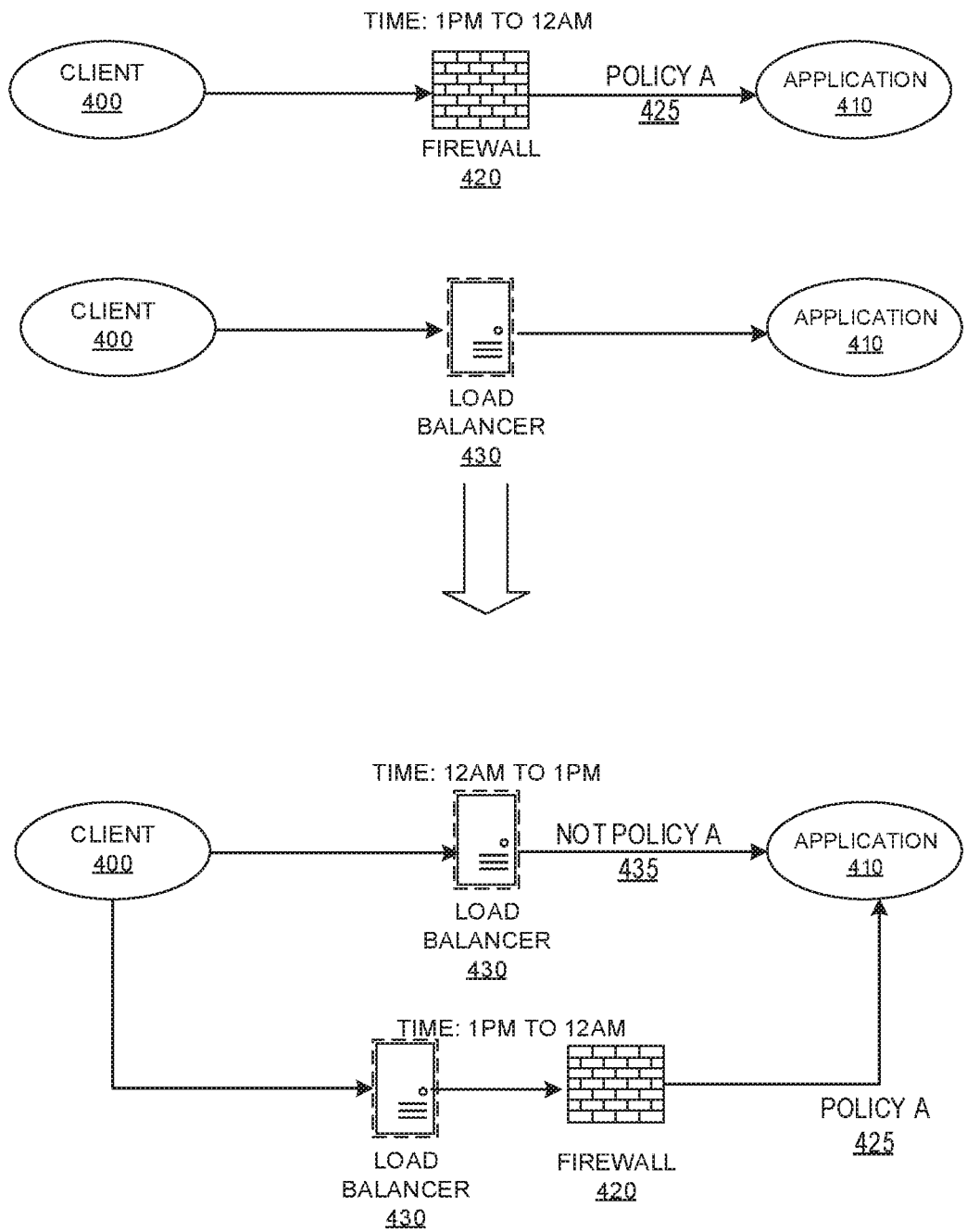
FIG. 4 is a block diagram of an example composition of policy graphs with temporal network policies.

As used herein, temporal policies generally refer to polices that are valid for a particular period of time. The particular period of time may be represented on the directed edge in the policy graphs. FIG. 4 is a block diagram of an example composition of policy graphs with temporal network policies. FIG. 4 includes two network policies, both of which include a client 400, an application 410, and a directed edge from client 400 to application 410. The first network policy also includes a firewall 420 and a temporal network policy. In this example, temporal network policy (e.g., policy A 425) is applicable during the time period from 1 pm to 12 am every day. Therefore, according to policy A 425, client 400 can access application 410 through firewall 420 from 1 pm to 12 am daily, and the access will be blocked during the rest of the day. The second network policy is a generic communication policy that includes a load balancer 430.

In this example, the first input network policy has a dynamic policy A, and the second input network policy does not have any dynamic policies. Therefore, traffic goes through composed policy when the dynamic policy A is satisfied, whereas traffic that does not satisfy policy A goes through the second network policy. As shown in FIG. 4, the composed network policy includes the same client 400 and application 410 with two directed edges. The composed network policy is a combination of two temporal network policies. The first temporal network policy corresponds to the directed edge from client 400 to application 410 passing through load balancer 430. The first temporal network policy (e.g., not policy A 435) is valid from 12 am to 1 pm. The second temporal network policy corresponds to the directed edge from client 400 to application 410 passing through both load balancer 430 and firewall 420. The second temporal network policy (e.g., policy A 425) is valid from 1 pm to 12 am.

B. Composing Stateful Network Policies

As used herein, a stateful network policy generally refers to a form of dynamic network policies that have conditions or events associated with the network function boxes (e.g., middleboxes) and the network traffic. The conditions can be specified on the edge of a policy graph and may comprise events that detectable by the network function boxes (e.g., middleboxes) based on the traffic passing through it.

A policy writer can get the condition or state variables associated with the network function boxes (e.g. a number of failed connections) via an open application programming interface (API). The policy writer can then write conditions using these variables, e.g. if an L-IDS detects 4 failed connections, then the system can reroute the flow to an H-IDS. The policy writer can also represent stateful network policies that are conditioned upon a sequence of events to occur.

Figure 5:
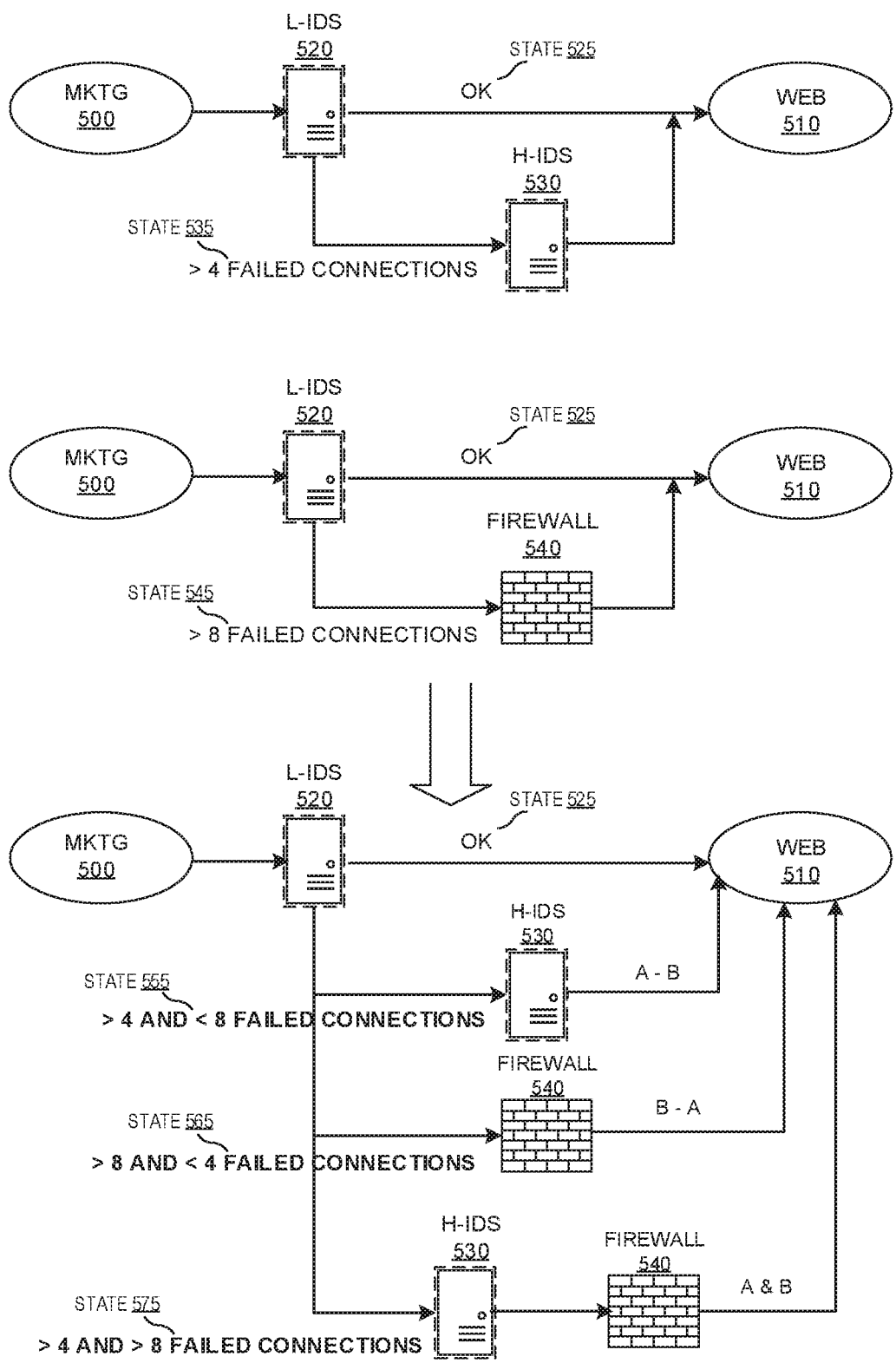
FIG. 5 is a block diagram of an example composition of policy graphs with stateful network policies.

FIG. 5 is a block diagram of an example composition of policy graphs with stateful network policies. FIG. 5 includes a client from marketing department (Mktg 500) and a website or web application (Web 510). Network packets from Mktg 500 first passes through a low-level intrusion detection system (L-IDS 520).

In the first stateful network policy, L-IDS 520 determines the state of the flow based on the number of failed connections. If there has been four or less failed connections, the L-IDS 520 can determine that the flow is in an OK state (e.g., state 525), and thus forward traffic directly to Web 510. On the other hand, if L-IDS 520 detects that there have been more than 4 failed connections (state 535), packets will be rerouted to a high-level intrusion detection system (H-IDS 530).

In the second stateful network policy, L-IDS 520 similarly determines the state of the flow based on the number of failed connections. If there has been eight or less failed connections, the L-IDS 520 can determine that the flow is in an OK state (e.g., state 525), and thus forward traffic directly to Web 510. On the other hand, if L-IDS 520 detects that there has been more than 8 failed connections (state 545), packets will be rerouted to a firewall 540 that applies preconfigured firewall policies on the packets.

In this case, both input network policies have dynamic policies. Therefore, traffic can go through composed policy if both of the dynamic policies are satisfied. If traffic satisfies policy A and not B (e.g., exclusive to A), then the packets can go through the first network policy. On the other hand, if traffic satisfies policy B and not A (e.g., exclusive to B), then the packets can go through the second network policy.

As shown in FIG. 5, the composed network policy includes a client from marketing department (Mktg 500), a website or web application (Web 510), and four directed edges from Mktg 500 to Web 510. The first directed edge in the composed policy graph passes through L-IDS 520 if L-IDS 520 determines that the flow is in an OK state 525 (e.g., with 4 or less failed connections). The second directed edge in the composed policy graph indicates that the packets are rerouted to an H-IDS 530, and policy A but not policy B applies to the packets, if L-IDS 520 determines that there have been greater than 4 but less than 8 failed connections (e.g., flow in state 555). The third directed edge in the composed policy graph indicates that the packets are rerouted to a firewall 520, and policy B but not policy A applies to the packets, if L-IDS 520 determines that there have been greater than 8 but less than 4 failed connections (e.g., flow in state 565). The fourth directed edge in the composed policy graph indicates that the packets are rerouted to H-LDS 530 and then firewall 520, where both policy A and policy B apply to the packets, if L-IDS 520 determines that there have been greater than 4 and greater than 8 failed connections (e.g., flow in state 575).

The composed policy graphs can often be pruned and simplified, because some policies may be unsatisfiable or cannot exist together. Therefore, such network policies may be removed from the composed policy graph. Also, the composed policy graph can be simplified by joining multiple policy edges whenever possible.

Figure 6:
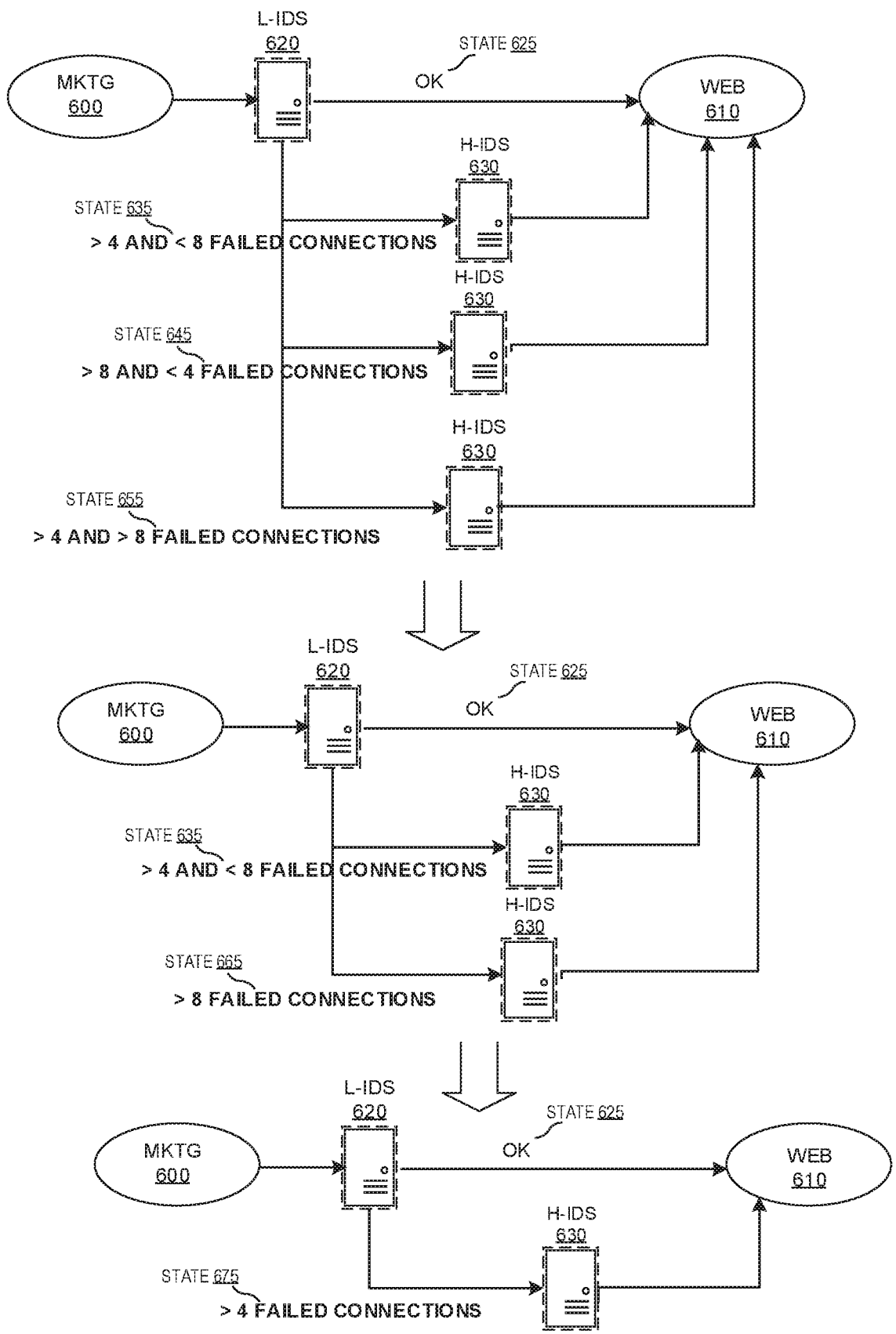
FIG. 6 is a block diagram of an example pruning of composed policy graph.

FIG. 6 is a block diagram of an example pruning of composed policy graph. FIG. 6 shows a composite network policy that includes a client from marketing department (Mktg 600), a website or web application (Web 610), and four directed edges from Mktg 600 to Web 610. Packets from Mktg 600 first passes through a low-level intrusion detection system (L-IDS 620).

The first directed edge in the composed policy graph indicates that packets are forwarded to Web 610 if L-IDS 620 determines that the flow is in an OK state 625 (e.g., with 4 or less failed connections). The second directed edge in the composed policy graph indicates that the packets are rerouted to an H-IDS 630, if L-IDS 620 determines that there have been greater than 4 but less than 8 failed connections (e.g., flow in state 635). The third directed edge in the composed policy graph indicates that the packets are rerouted to H-IDS 630, if L-IDS 620 determines that there have been greater than 8 but less than 4 failed connections (e.g., flow in state 645). The fourth directed edge in the composed policy graph indicates that the packets are rerouted to H-LDS 630, if L-IDS 620 determines that there have been greater than 4 and greater than 8 failed connections (e.g., flow in state 655).

In this example, state 645 is unsatisfiable because greater than 8 failed connections and less than 4 failed connections cannot co-exist together. Therefore, the directed edge corresponding to state 645 can be removed from the composed policy graph during the pruning process. Also, to satisfy both the condition of >4 failed connections and the condition of >8 failed connections, the latter condition of >8 failed connections shall be satisfied. Therefore, state 655 can be simplified to ">8 failed connections."

Hence, after pruning off unsatisfiable condition and simplify compound conditions, the composed policy graph has three directed edges from Mktg 600 to Web 610. The first directed edge in the pruned policy graph indicates that packets are forwarded to Web 610, if L-IDS 620 determines that the flow is in an OK state 625 (e.g., with 4 or less failed connections). The second directed edge in the pruned policy graph indicates that the packets are rerouted to an H-IDS 630, if L-IDS 620 determines that there have been greater than 4 but less than 8 failed connections (e.g., flow in state 635). The third directed edge in the pruned policy graph indicates that the packets are rerouted to H-IDS 630, if L-IDS 620 determines that there have been greater than 8 failed connections (e.g., flow in state 665).

Next, the pruned policy graph can be further simplified if multiple directed edges share the same intermediary network function boxes (middleboxes). In this example, both the directed edge corresponding to state 635 and the directed edge corresponding to state 665 passes through H-IDS 630. Thus, the two directed edges can be combined into a single directed edge that includes H-IDS 630 and the combined state 675. In order to satisfy both state 635 (e.g., >4 and <8 failed connections) and state 665 (e.g., >8 failed connections), state 675 (e.g., >4 failed connections) shall be satisfied. Therefore, the final simplified policy graph includes Mktg 600, Web 610, and two directed edges. The first directed edge indicates that packets are forwarded directly to Web 610, if L-IDS 620 determines an OK state 625 (e.g., with four or less failed connections). The second directed edge indicates that packets are rerouted to H-IDS 630, if L-IDS 620 determines state 675 (e.g., more than four failed connections).

Composing QoS and Dynamic Policies

Figure 7:
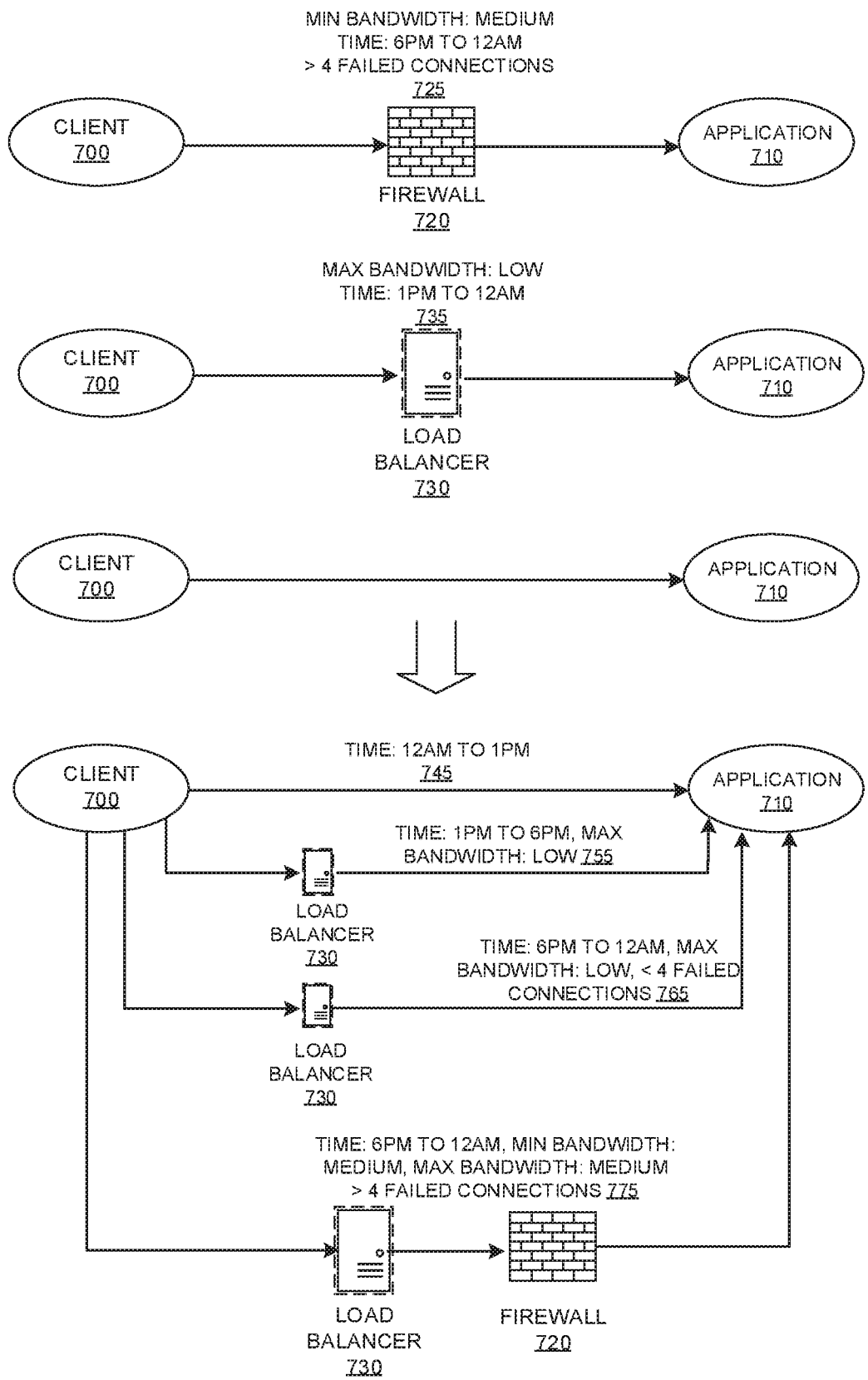
FIG. 7 is a block diagram of an example composition of policy graphs with both QoS and dynamic network policies.

FIG. 7 is a block diagram of an example composition of policy graphs with both QoS and dynamic network policies. In this example, the system can generate a composed policy graph by combining three network policies. Each network policy includes a client 700, an application 710, and a directed edge from client 700 to application 710. The first example network policy is both a dynamic policy and a QoS policy. The directed edge in the first network policy passes through a firewall 720. Packets from client 700 are forwarded to application 710 if conditions 725 are satisfied. Specifically, conditions 725 include a priority label of medium for the guaranteed minimum bandwidth QoS metric. Moreover, conditions 725 are valid from 6 pm to 12 am daily. Also, firewall 720 blocks the packets from client 700 if there are more than 4 failed connections. In summary, conditions 725 indicate that packets from client 700 can be allowed by firewall 720 and forwarded to application 710, if (1) the minimum bandwidth is guaranteed to be at least medium level, (2) there are less than 4 failed connections, and (3) the time period is between 6 pm and 12 am.

The second example network policy is a temporal network policy and a QoS policy. The directed edge in the second network policy passes through a load balancer 730. Packets from client 700 are forwarded to application 710 if conditions 735 are satisfied. Specifically, conditions 735 include a priority label of low for the allowed maximum bandwidth QoS metric. Moreover, conditions 735 are valid from 1 pm to 12 am daily. Therefore, conditions 735 indicate that packets from client 700 can be allowed by firewall 720 and forwarded to application 710, if (1) the maximum bandwidth allowed is at low priority level, and (3) the time period is between 1 pm and 12 am.

The third example network policy is a simply policy that forwards packets from client 700 directly to application 710.

To combine the three network policies, the system can first compose the temporal policies. In this example, the temporal condition in the first example network policy applies to the time period of 6 pm to 12 am, and the temporal condition in the second example network policy applies to the time period of 1 pm to 12 am. Thus, the temporal condition in the composed network policy can be divided into three different time periods: (1) 6 pm to 12 am during which all three network policies apply, (2) 12 am to 1 pm during which the third network policy applies, and (3) 1 pm to 6 pm during which the second network policy and the third network policy apply.

Next, the system can compose stateful network policies. The stateful condition in the first example network policy applies when there are greater than 4 failed connections. Therefore, the stateful condition in the composed network policy can be divided into two possible states: (1) if there are greater than 4 failed connections, then all three network policies apply; and (2) if there are 4 or less failed connections, then the second network policy and the third network policy apply.

Then, the system can combine the above temporal conditions and stateful conditions to generate applicable directed edges in the composed policy graph between client 700 and application 710. For example, because only the third network policy applies between 12 am and 1 pm, the first directed edge in the composed policy graph includes condition 745, which indicates that packets are forwarded directly from client 700 to application 710 per the third network policy during the time period 12 am to 1 pm.

Moreover, the second network policy and the third network policy (but not the first network policy) apply when either (1) the time period is between 1 pm to 6 pm (condition 755), or (2) the time period is between 6 pm and 12 am and there are less than 4 failed connections (condition 765). Therefore, two separate directed edges corresponding to condition 755 and condition 765 can be created in the composed policy graph. Each directed edge includes load balancer 730 from the second network policy.

Also, because all three network policies apply during 6 pm to 12 am and when there are greater than 4 failed connections, the fourth directed edge in the composed policy graph includes both load balancer 730 (from the second network policy) and firewall 720 (from the first network policy) and composed condition 775. Condition 775 indicates that this directed edge applies when the time period is between 6 pm and 12 am and when there are greater than 4 failed connections.

Note that other combinations of the temporal conditions and the stateful conditions are either unsatisfiable or can be simplified. Thus, the pruned (or simplified) composed policy graph includes the above four directed edges.

Finally, the system can compose QoS policies according to FIG. 3 described above. In this example, the QoS metric (e.g., minimum bandwidth: medium) in the first network policy and the QoS metric (e.g., maximum bandwidth: low) in the second network policy are related according to Table 3 above. Next, the system can determine that there is a comparison relationship between the minimum bandwidth guaranteed and the maximum bandwidth allowed. Therefore, if the priority label for the minimum bandwidth guaranteed is greater than the priority label for the maximum bandwidth allowed as shown in FIG. 7, the system can change the priority label of the maximum bandwidth allowed to be medium, which matches the priority label of the minimum bandwidth guaranteed. Accordingly, condition 775 on the fourth directed edge in the composed policy graph is further modified to include the QoS policy "minimum bandwidth: medium, maximum bandwidth: medium."

On the other hand, the second and third directed edges relate to the second and third input network policies, which has a single QoS metric "maximum bandwidth: low." Therefore, for these two directed edges, the system can modify condition 755 and condition 765 each to include the QoS metric "maximum bandwidth: low." The first directed edge is related to the third network policy, which includes no QoS metric. Therefore, no modification is involved in the first directed edge.

Accordingly, the final composed policy graph combines three network policies, including temporal policies, stateful policies, and QoS policies, as shown in FIG. 7. The composed policy graph includes client 700, application 710, and four directed edges from client 700 to application 710. The first directed edge corresponds to condition 745, which applies the third input network policy during the time period 12 am to 1 pm. The second directed edge corresponds to condition 755, which applies the second and third input network policies during time period 1 pm to 6 pm with maximum bandwidth allowed set to a low priority label. The third directed edge corresponds to condition 765, which applies the second and third input network policies during time period 6 pm to 12 am when there are 4 or less failed connections detected with maximum bandwidth allowed set to a low priority label. The fourth directed edge corresponds to condition 775, which applies all three input network policies during time period 6 pm to 12 am when there more than 4 failed connections detected with the minimum bandwidth guaranteed set to a medium priority label and the maximum bandwidth allowed set to a medium priority label.

Processes of Generating Composite Network Policy

Figure 8:
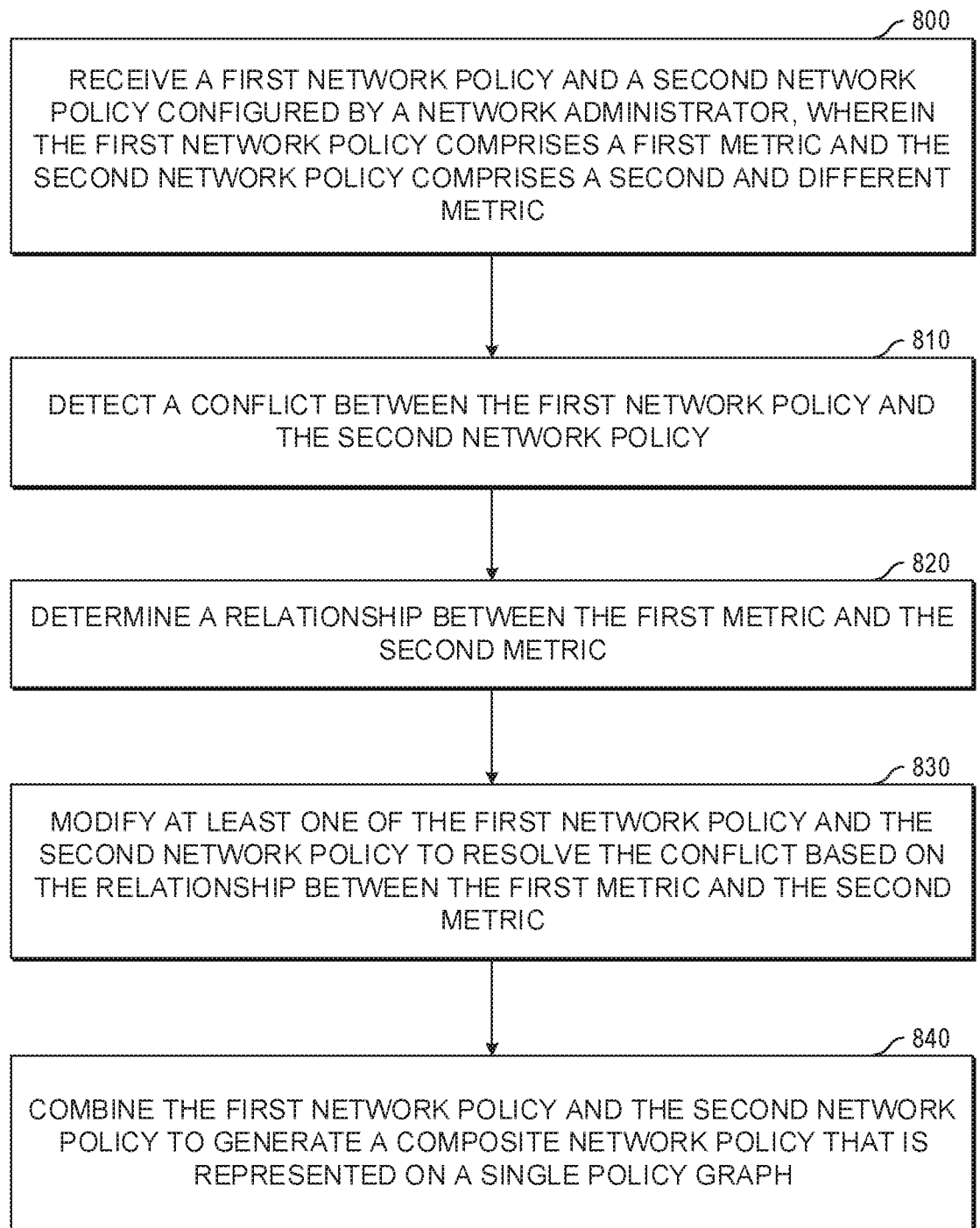
FIG. 8 is a flowchart of an example process of generating composite network policy.

FIG. 8 is a flowchart of an example method (e.g., process) of generating composite network policy. During operations, a network device (e.g., a policy composition engine) can receive a first network policy and a second network policy configured by a network administrator (operation 800). Here, the first network policy comprises a first metric and the second network policy comprises a second and different metric. Then, the network device can detect a conflict between the first network policy and the second network policy (operation 810). Also, the network device can determine a relationship between the first metric and the second metric (operation 820). For example, the network device may determine that the first metric and the second metric have a comparison relationship. In another example, the network device may determine that the first metric depends on the second metric in a dependency relationship. In yet another example, the network device may determine that the first metric and the second metric are incompatible to co-exist.

Further, the network device can modify at least one of the first network policy and the second network policy to resolve the conflict based on the relationship between the first metric and the second metric (operation 830). For example, the network device can modify a worse performing metric to match a better performing metric between the first metric and the second metric. Also, the network device can modify the first metric to match the second metric in response to the second metric being a dependent metric upon the first metric. Furthermore, the network device can remove one of the first metric and the second metric in response to determining that the first metric and the second metric are incompatible to co-exist. Next, the network device can combine the first network policy and the second network policy to generate a composite network policy that is represented on a single policy graph (operation 840).

Figure 9:
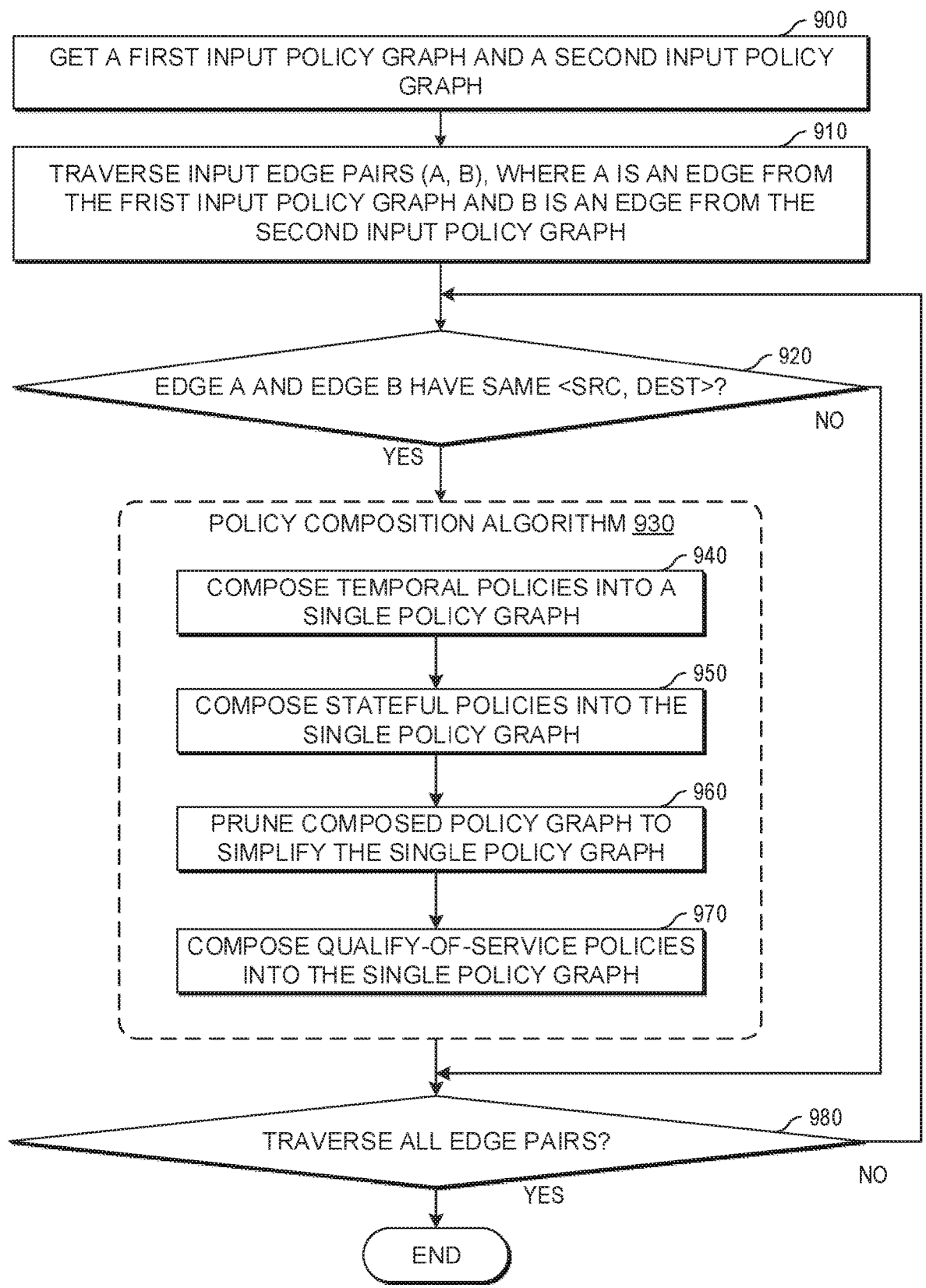
FIG. 9 is a flowchart of an example process of generating composite network policies.

FIG. 9 is a flowchart of another example method (e.g., process) of generating composite network policy. During operations, a network device can get a first input policy graph and a second input policy graph (operation 900). Then, the network device can traverse each of the input edge pairs (A, B), where A is an edge from the first input policy graph and B is an edge from the second input policy graph (operation 910). Next, the network device can determine whether edge A and edge B have the same source and destination <src, dest> (operation 920). If not, the network device proceeds with the next edge pair. However, if edge A and edge B share the same <src, dest>, then network device can perform a policy composition algorithm 930. Specifically, the network device can first compose temporal policies into a single policy graph (operation 940). Then, the network device can compose stateful policies into the single policy graph (operation 950). Thereafter, the network device can prune composed policy graph to simply the single policy graph (operation 960). Finally, the network device can compose Qualify-of-Service (QoS) policies into the single policy graph (operation 970). After completing the policy composition algorithm 930 for edge pair (A, B), the network device determines whether it has traversed all edge pairs (operation 980). If not, the network device proceeds with the next edge pair. After all edge pairs have been traversed, the network device generates the composite policy graph as represented in the single policy graph.

In some examples, the first network policy includes (1) a Quality-of-Service (QoS) policy that includes a QoS metric or (2) a dynamic policy that varies based on a predetermined condition. In some examples, the dynamic policy may be a stateful policy that includes a condition associated with a network middlebox. If the network middlebox detects an occurrence of the condition based on network traffic that passes through the network middlebox, the network device further can enforce the first network policy. In some examples, the dynamic policy may be a temporal policy that includes a predetermined time period, and the network device can further enforce the first network policy during the predetermine time period.

In some examples, the network device can select a first policy graph and a second policy graph. Then, the network device can traverse each input edge pair (A, B), such that A is an edge from the first policy graph and B is an edge from the second policy graph. If the network device determines that the input edge pair (A, B) have the same source and destination address, the network device may repeatedly combine the first network policy and the second network policy to generate a composite network policy until all input edge pairs are traversed. In these examples, combining the first network policy and the second network policy to generate the composite network policy may involve: composing temporal network policies in the single policy graph; composing stateful network policies in the single policy graph; pruning the single policy graph to simplify the single policy graph; and composing QoS network policies in the single policy graph.

In some examples, if the network device determines that the first metric and the second metric have a comparison relationship, the network device can identify one of the first metric and the second metric to be a better performing metric, and modify the other of the first metric and the second metric to be the same as the better performing metric.

In some examples, if the network device determines that the first metric depends on the second metric, the network device can infer that the first metric is a better performing metric, and modify the second metric to be the same as the first metric.

In some examples, if the network device determines that the first metric and the second metric are incompatible to co-exist, the network device may remove one of the first metric and the second metric.

Here, the first metric may be, but is not limited to, a minimum bandwidth guaranteed to a flow in the network; a maximum bandwidth permitted for the flow in the network; a latency for a data packet to be transmitted from one node to another node in the network; a jitter value comprising a difference between a first latency associated with a first data packet and a second latency associated with a second data packet; a packet drop rate associated with a number of packets lost in transmission during a particular time interval; etc.

In some examples, if the network device detects that the minimum bandwidth guaranteed to a flow is greater than the maximum bandwidth permitted for the flow, the network device can change the maximum bandwidth permitted for the flow to match the minimum bandwidth guaranteed to the flow.

In some examples, if the network device detects that the first priority is lower than the second priority, the network device can increase a first priority associated with the latency to match a second priority associated with the minimum bandwidth.

In some examples, if the network device detects that the first priority associated with the drop rate is lower than a second priority associated with the minimum bandwidth, the network device can increase a first priority associated with the drop rate.

In some examples, if the network device detects that the priority associated with jitter is high, the network device can either (1) remove latency guarantee, or (2) set the priority associated with the jitter to low.

In some examples, if the network device detects that the priority associated with jitter being high, the network device can either (1) remove drop rate guarantee, or (2) set the priority associated with the jitter to low.

Network Device to Generate Composite Network Policy

As used herein, a network device may be implemented, at least in part, by a combination of hardware and programming. For example, the hardware may comprise at least one processor (e.g., processor 1010) and the programming may comprise instructions, executable by the processor(s), stored on at least one machine-readable storage medium (e.g., 1020). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

Figure 10:
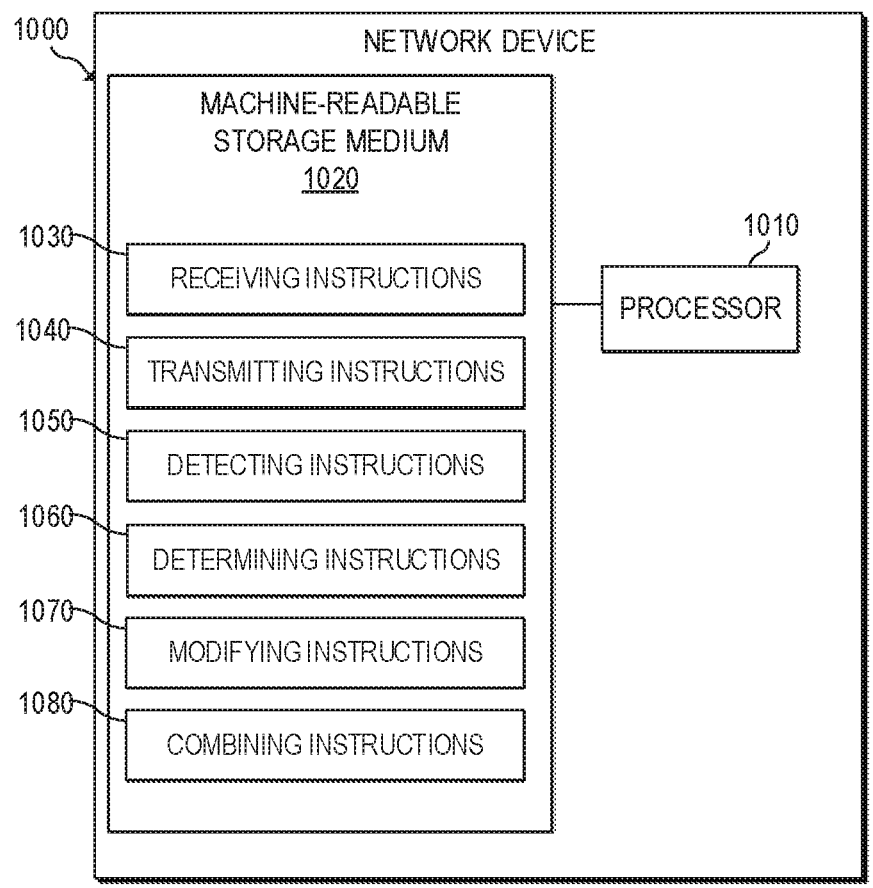
FIG. 10 is a block diagram of an example network device to generate composite network policy.

The at least one processor 1010 may fetch, decode, and execute instructions stored on storage medium 1020 to perform the functionalities described below in relation to instructions 1030-1080. In other examples, the functionalities of any of the instructions of storage medium 1020 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 10, storage medium 1020 may be implemented by one machine-readable storage medium, or multiple machine-readable storage media.

Although network device 1000 includes at least one processor 1010 and machine-readable storage medium 1020, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 1030-1080 may be executed by processor 1010 to: receive a first network policy and a second network policy configured by a network administrator, wherein the first network policy comprises a first metric and the second network policy comprises a second and different metric; detect a conflict between the first network policy and the second network policy; determine a relationship between the first metric and the second metric; determine that the first metric and the second metric have a comparison relationship; determine the first metric depends on the second metric in a dependency relationship; determine the first metric and the second metric are incompatible to co-exist; etc.

In addition, instructions 1030-1080 may also be executed by processor 1010 to: modify at least one of the first network policy and the second network policy to resolve the conflict based on the relationship between the first metric and the second metric; identify one of the first metric and the second metric to be a better performing metric; modify the other of the first metric and the second metric to be the same as the better performing metric, responsive to determining the relationship comprises determining that the first metric and the second metric have a comparison relationship; infer that the first metric is a better performing metric; modify the second metric to be the same as the first metric, responsive to determining that the first metric depends on the second metric; change the maximum bandwidth permitted for the flow to match the minimum bandwidth guaranteed to the flow, in response to detecting that the minimum bandwidth guaranteed to the flow being greater than the maximum bandwidth permitted for the flow; increase a first priority associated with the latency to match a second priority associated with the minimum bandwidth, in response to detecting that the first priority being lower than the second priority; increase a first priority associated with the drop rate, in response to detecting that the first priority associated with the drop rate being lower than a second priority associated with the minimum bandwidth; perform one of (1) removing latency guarantee and (2) setting the priority associated with the jitter to low, in response to detecting that the priority associated with jitter being high; perform one of (1) removing drop rate guarantee and (2) setting the priority associated with the jitter to low, in response to detecting that the priority associated with jitter being high; modify a worse performing metric to match a better performing metric between the first metric and the second metric; modify the first metric to match the second metric in response to the second metric being a dependent metric upon the first metric; remove one of the first metric and the second metric in response to determining that the first metric and the second metric are incompatible to co-exist; etc.

Moreover, instructions 1030-1080 may be executed by processor 1010 further to: combine the first network policy and the second network policy to generate a composite network policy that is represented on a single policy graph; select a first policy graph and a second policy graph; traverse each input edge pair (A, B) such that A is an edge from the first policy graph and B is an edge from the second policy graph; repeatedly combine the first network policy and the second network policy to generate the composite network policy until all input edge pairs are traversed, in response to determining that the input edge pair (A, B) have the same source and destination address; compose temporal network policies in the single policy graph; compose stateful network policies in the single policy graph; prune the single policy graph to simplify the single policy graph; compose QoS network policies in the single policy graph; etc.

We claim:

1. A method comprising:
receiving, by a network device in a network, a first network policy and a second network policy configured by a network administrator, wherein the first network policy comprises a first metric and the second network policy comprises a second and different metric;
detecting, by the network device, a conflict between the first network policy and the second network policy;
determining, by the network device, a relationship between the first metric and the second metric;
modifying, by the network device, at least one of the first network policy and the second network policy to resolve the conflict based on the relationship between the first metric and the second metric; and
combining, by the network device, the first network policy and the second network policy to generate a composite network policy that is represented on a single policy graph.

2. The method of claim 1, wherein the first network policy comprises at least one of (1) a Quality-of-Service (QoS) policy that includes a QoS metric and (2) a dynamic policy that varies based on a predetermined condition.

3. The method of claim 2, wherein the dynamic policy comprises a stateful policy that includes a condition associated with a network middlebox, and in response to network middlebox detecting an occurrence of the condition based on network traffic that passes through the network middlebox, the network device further enforces the first network policy.

4. The method of claim 2, wherein the dynamic policy comprises a temporal policy that includes a predetermined time period, and the network device further enforces the first network policy during the predetermine time period.

5. The method of claim 1, further comprising:
selecting a first policy graph and a second policy graph;
traversing each input edge pair (A, B) such that A is an edge from the first policy graph and B is an edge from the second policy graph;
in response to determining that the input edge pair (A, B) have the same source and destination address, repeatedly combining the first network policy and the second network policy to generate the composite network policy until all input edge pairs are traversed.

6. The method of claim 1, wherein combining the first network policy and the second network policy to generate the composite network policy further comprises:
composing temporal network policies in the single policy graph;
composing stateful network policies in the single policy graph;
pruning the single policy graph to simplify the single policy graph; and
composing QoS network policies in the single policy graph.

7. The method of claim 1, further comprising: responsive to determining the relationship comprises determining that the first metric and the second metric have a comparison relationship,
identifying one of the first metric and the second metric to be a better performing metric; and
modifying the other of the first metric and the second metric to be the same as the better performing metric.

8. The method of claim 1, further comprising: responsive to determining that the first metric depends on the second metric,
inferring that the first metric is a better performing metric; and
modifying the second metric to be the same as the first metric.

9. The method of claim 1, further comprising: responsive to determining that the first metric and the second metric are incompatible to co-exist, removing one of the first metric and the second metric.

10. A network device in a network comprising at least:
a memory;
a processor executing instructions stored in the memory to:
receive a first network policy and a second network policy configured by a network administrator, wherein the first network policy comprises a first metric and the second network policy comprises a second and different metric;
detect a conflict between the first network policy and the second network policy;
determine a relationship between the first metric and the second metric; and modifying, by the network device, at least one of the first network policy and the second network policy to resolve the conflict based on the relationship between the first metric and the second metric; and
combine the first network policy and the second network policy to generate a composite network policy that is represented on a single policy graph.

11. The network device of claim 10, wherein the first network policy comprises a Quality-of-Service (QoS) policy that includes at least the first metric.

12. The network device of claim 10, wherein the first metric comprises: a minimum bandwidth guaranteed to a flow in the network; a maximum bandwidth permitted for the flow in the network; a latency for a data packet to be transmitted from one node to another node in the network; a jitter value comprising a difference between a first latency associated with a first data packet and a second latency associated with a second data packet; and a packet drop rate associated with a number of packets lost in transmission during a particular time interval.

13. The network device of claim 12, wherein the processor further executing the instructions to change the maximum bandwidth permitted for the flow to match the minimum bandwidth guaranteed to the flow, in response to detecting that the minimum bandwidth guaranteed to the flow being greater than the maximum bandwidth permitted for the flow.

14. The network device of claim 12, wherein the processor further executing the instructions to increase a first priority associated with the latency to match a second priority associated with the minimum bandwidth, in response to detecting that the first priority being lower than the second priority.

15. The network device of claim 12, wherein the processor further executing the instructions to increase a first priority associated with the drop rate, in response to detecting that the first priority associated with the drop rate being lower than a second priority associated with the minimum bandwidth.

16. The network device of claim 12, wherein the processor further executing the instructions to perform one of (1) removing latency guarantee and (2) setting the priority associated with the jitter to low, in response to detecting that the priority associated with jitter being high.

17. The network device of claim 12, wherein the processor further executing the instructions to perform one of (1) removing drop rate guarantee and (2) setting the priority associated with the jitter to low, in response to detecting that the priority associated with jitter being high.

18. A non-transitory machine-readable storage medium encoded with instructions executable by at least one processor of a network device, the machine-readable storage medium comprising instructions to:
receive a first network policy and a second network policy configured by a network administrator, wherein the first network policy comprises a first metric and the second network policy comprises a second and different metric;
detect a conflict between the first network policy and the second network policy;
determine a relationship between the first metric and the second metric; and
modifying, by the network device, at least one of the first network policy and the second network policy to resolve the conflict based on the relationship between the first metric and the second metric; and
combine the first network policy and the second network policy to generate a composite network policy that is represented on a single policy graph,
wherein the first network policy comprises at least one of (1) a Quality-of-Service (QoS) policy that includes a QoS metric and (2) a dynamic policy that includes a stateful network policy or a temporal network policy.

19. The non-transitory machine-readable storage medium of claim 18, wherein determining the relationship comprises:
    determining that the first metric and the second metric have a comparison relationship;
    determining the first metric depends on the second metric in a dependency relationship; and
    determining the first metric and the second metric are incompatible to co-exist.

20. The non-transitory machine-readable storage medium of claim 18, wherein modifying at least one of the first network policy and the second network policy to resolve the conflict comprises:
    modifying a worse performing metric to match a better performing metric between the first metric and the second metric;
    modifying the first metric to match the second metric in response to the second metric being a dependent metric upon the first metric; and
    removing one of the first metric and the second metric in response to determining that the first metric and the second metric are incompatible to co-exist.

* * * * *